United States Patent [19]
Knepler

[11] Patent Number: 5,200,221
[45] Date of Patent: Apr. 6, 1993

[54] METHOD FOR CONTROLLING A BEVERAGE BREWING APPARATUS

[75] Inventor: John T. Knepler, Chatham, Ill.

[73] Assignee: Bunn-O-Matic Corporation, Springfield, Ill.

[21] Appl. No.: 816,969

[22] Filed: Jan. 3, 1992

Related U.S. Application Data

[62] Division of Ser. No. 555,046, Jul. 19, 1990.

[51] Int. Cl.$^5$ .............................................. A23F 5/00
[52] U.S. Cl. ..................................... 426/231; 426/433
[58] Field of Search ................. 426/231, 433; 99/282; 392/451

[56] References Cited

U.S. PATENT DOCUMENTS

| | | | |
|---|---|---|---|
| 3,523,178 | 8/1970 | Spensley et al. | 392/451 |
| 3,793,934 | 2/1974 | Martin | 99/282 |
| 4,094,233 | 6/1978 | Martin | 99/305 |
| 4,476,775 | 10/1984 | Daugherty | 99/295 |

Primary Examiner—George Yeung
Attorney, Agent, or Firm—Trexler, Bushnell, Giangiorgi & Blackstone, Ltd.

[57] ABSTRACT

A temperature control device and method for controlling water temperature for a fill water displacement beverage brewing apparatus. The beverage brewing apparatus includes a heated water reservoir for retaining a predetermined volume of water in a heated state and a thermostatically controlled heating device for heating the water in the heated water reservoir within a predetermined temperature range. The temperature control device includes a brew cycle activation device which automatically overrides the thermostatically controllable heating device for activating the heating device upon initiation of the brew cycle. The method heats fill water introduced into the reservoir regardless of the temperature of the water retained in the heated reservoir to reduce the time required to heat fill water to a desired water temperature.

3 Claims, 1 Drawing Sheet

METHOD FOR CONTROLLING A BEVERAGE BREWING APPARATUS

This is a divisional of copending application Ser. No. 07/555,046 filed on Jul. 19, 1990.

BACKGROUND OF THE INVENTION

This invention relates to a temperature control device for a beverage brewing and hot water dispensing apparatus.

A fill water displacement beverage brewing and hot water dispensing apparatus provides many advantages when brewing coffee, most notably rapid production of a brewed beverage. Rapid production of brewed beverages is achieved since a heated water reservoir retains a predetermined volume of water in a heated state. Displacement of the heated water retained in the reservoir by fill water distributes the heated water over a beverage brewing substance for infusion thereof producing a brewed beverage. Examples of such beverage brewing apparatus include the Automatic Coffee Maker with Inlet Water Control Means in Response to Cold Water and Hot Water Levels, U.S. Pat. No. 4,094,233 to Martin and the Coffee Making Machine U.S. Pat. No. 4,476,775 to Daugherty.

Displacement of the heated water retained in the heated water reservoir by unheated fill water requires the unheated fill water to be heated to and maintained at a desired beverage brewing temperature to achieve a desired brewed beverage. Heating of the unheated fill water is controlled by thermostatic heating means employing electric, hydraulic (bulb), or bi-metal types of thermostatic controls to control a heating element. Typically the thermostatic control is not positioned at the bottom of the reservoir. When unheated fill water is introduced into the reservoir it settles to the bottom displacing the heated water upwardly towards the top of the reservoir. The thermostatic control will initiate a heating cycle to heat the unheated fill water only after the level of the fill water has reached the thermostatic control.

Heating of the non-heated fill water creates a problem in typical fill water displacement beverage brewing apparatus when multiple volumes of brewed beverage must be produced. This problem is created since the unheated fill water is not heated to a desired beverage brewing temperature prior to infusing a beverage brewing substance. The result of insufficiently heated fill water is an inferior brewed beverage. No known prior art device has addressed or attempted to overcome this problem.

OBJECTS AND SUMMARY OF THE INVENTION

A general object of the present invention is to provide a beverage brewing and hot water dispensing apparatus which reduces the time required to heat fill water disposed in a heated water reservoir during a brewing cycle to increase the consistency of the brewed beverage produced thereby.

Another object of the present invention is to provide a temperature control device for a beverage brewing and hot water dispensing apparatus which, upon initiation of a brew cycle, automatically overrides thermostatic control of heating means employed to heat the water retained in a heated water reservoir.

A more specific object of the present invention is to provide a temperature control device for a beverage brewing and hot water dispensing apparatus which automatically returns control to thermostatically control heating means at a predetermined time or event.

Briefly, and in accordance with the foregoing, the present invention comprises a temperature control device for a beverage brewing and hot water dispensing apparatus. The beverage brewing apparatus includes a heated water reservoir for retaining a predetermined volume of water in a heated state and thermostatically controlled heating means for heating the water in the heated water reservoir within a predetermined temperature range. The temperature control device includes brew cycle activation means which automatically overrides the thermostatically controllable heating means for activating the heating means upon initiation of the brew cycle. The present invention begins heating fill water introduced into the reservoir regardless of the temperature of the water retained in the heated water reservoir to reduce the time required to heat fill water to a desired water temperature.

BRIEF DESCRIPTION OF THE DRAWINGS

The features of the present invention which, are believed to be novel, are set forth with particularity in the appended claims. The organization and manner of the operation of the invention, together with the further objects and advantages thereof, may be understood best by reference to the following description taken in connection with the accompanying drawings wherein like reference numerals identify like elements in which:

DETAILED DESCRIPTION OF THE ILLUSTRATED EMBODIMENT

Figure 1:
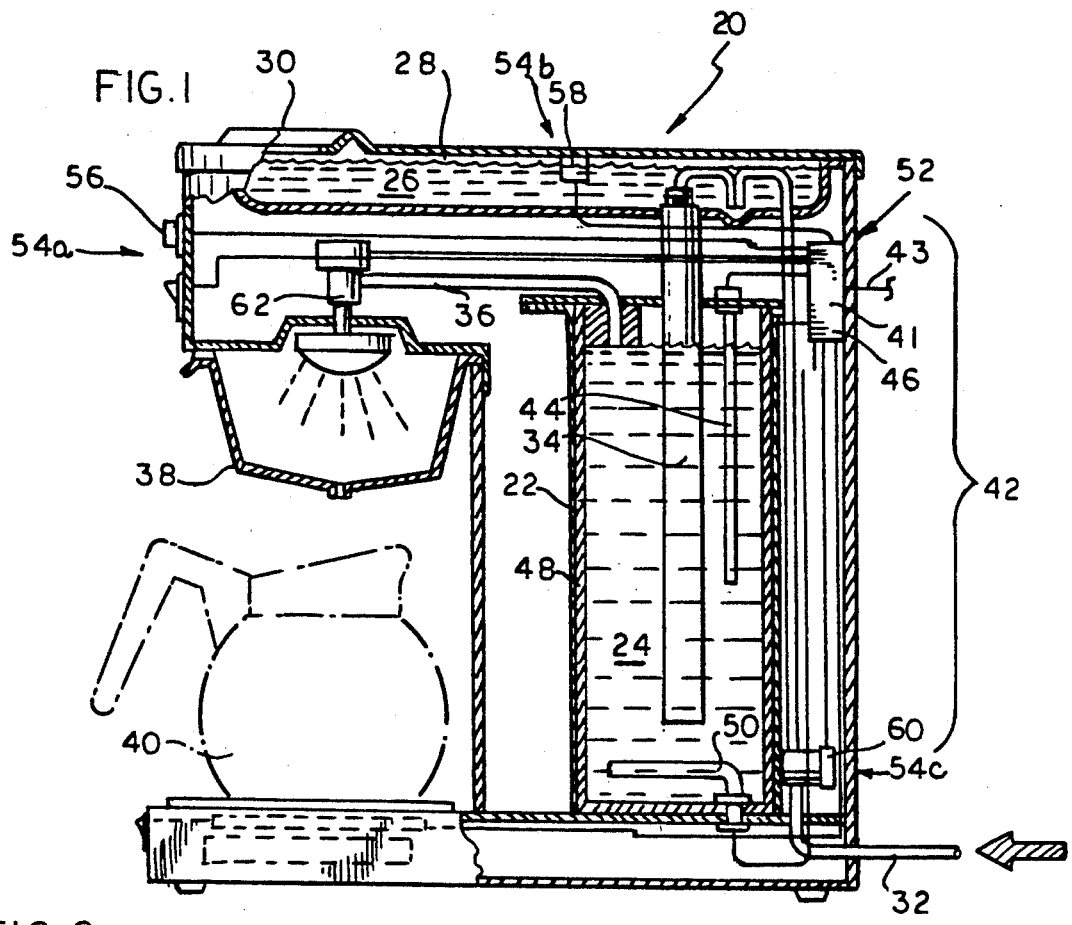
FIG. 1 is a partial fragmentary side sectional view of a fill water displacement beverage brewing apparatus including both manual and automatic fill water systems.

While this invention may be susceptible to embodiment in different forms, there is shown in the drawings and will be described herein in detail, specific embodiments with the understanding that the present disclosure is to be considered an exemplification of the principle of the invention, and is not intended to limit the invention to the embodiments illustrated.

A beverage brewing and hot water dispensing apparatus 20 is a fill water displacement type apparatus including a heated reservoir 22 which retains a volume of brewing water 24 in a heated state. A similarly constructed apparatus may be employed exclusively to dispense heated water or dispense heated water and brew beverages. Fill water 26 is disposed into a basin 28 either manually through a manual fill opening 30 or automatically through an automatic fill line 32. The fill water 26 is retained in the basin 28 until a predetermined volume is attained. Once a predetermined volume is attained, fill water 26 flows through a fill tube 34 into the heated reservoir 22 to displace heated water 24 through a discharge tube 36 for infusion with a beverage brewing substance retained in a brewing basket 38. The resulting brewed beverage is captured by a decanter 40 positioned underneath the brewing basket 38.

A control means 41 is employed to regulate timing, switching and control of various processes of the beverage brewing apparatus 20. The control means 41 is of a known construction and powered through power cord 43.

Thermostatically controllable heating means 42 maintain the brewing water 24 within a predetermined temperature range. The thermostatically controllable heating means 42 include a temperature sensing probe 44 positioned in the heated reservoir 22, a thermostat 46 associated with the control means 41, a heated blanket 48 enveloping the reservoir 22 and a heating element 50 generally positioned towards the bottom of the heated reservoir 22. The above noted components of the thermostatically controllable heating means 42 are devices of known construction and the position of these devices may be modified from that as illustrated without parting from the scope of the invention. The heated blanket 48 maintains a generally consistent temperature of heated water 24 retained in the reservoir 22. The temperature probe 44 senses the temperature of the water 24 in the reservoir 22 and at a lower temperature bound the thermostat 46 activates the heating element 50 to heat the brewing water 24. At an upper temperature bound the thermostat 46 deactivates the heating element 50.

In the present invention the thermostatically controllable heating means 42 is overridden by a temperature control device 52 which includes heating cycle override means 54.

Three embodiments of the present invention are described herein and reference is had to FIG. 1 for each of the embodiments. In describing each embodiment like elements are identified by common reference numerals and similar or equivalent elements are denoted by a lower case alphabetic suffix.

In a first embodiment of the present invention, the heating cycle override means 54a comprises a brew switch 56 which is activated to initiate a brewing cycle. Activation of the brew switch 56 signals to the control means 41 that a brewing cycle is to be initiated and that, regardless of the temperature of the brew water 24 retained in the heated reservoir 22, the heating element 50 should be activated. The heating element 50 remains activated and heats the brewing water 24 and the incoming fill water 26 until the lapse of a predetermined period of time or occurrence of an event such as after a second activation of the brew switch 56.

In a second embodiment of the present invention, the heating cycle override means 54b is embodied in a level sensor 58. The level sensor 58 is positioned inside of the basin 28 and senses the level of the fill water 26 disposed in the basin 28. When the level sensor 58 detects a predetermined amount of fill water 26 the temperature control means 52 activates the heating element 50 as described hereinabove in the first embodiment.

In a third embodiment of the present invention, the heating cycle override means 54c is embodied in an inlet solenoid valve 60 attached to the automatic fill line 32. Upon initiation of a brewing cycle, the inlet solenoid valve 60 is activated into an open position to permit fill water 26 to flow through the automatic fill line 32 into the basin 28. Simultaneously, a discharge solenoid valve 62 is activated to the closed position to prevent discharge of brewing water 24 through the discharge tube 36. Activation of the inlet solenoid valve 60 indicates to the temperature control device 52 that the heating element 50 is to be activated as described hereinabove in the first embodiment. In this embodiment, the level sensor 58 also indicates when a desired volume of fill water 26 has been disposed into the basin 28 whereupon the inlet solenoid valve 60 is activated to the closed position and the discharge solenoid valve 62 is activated into the open position to permit brewing water 24 to flow therethrough.

Figure 2:
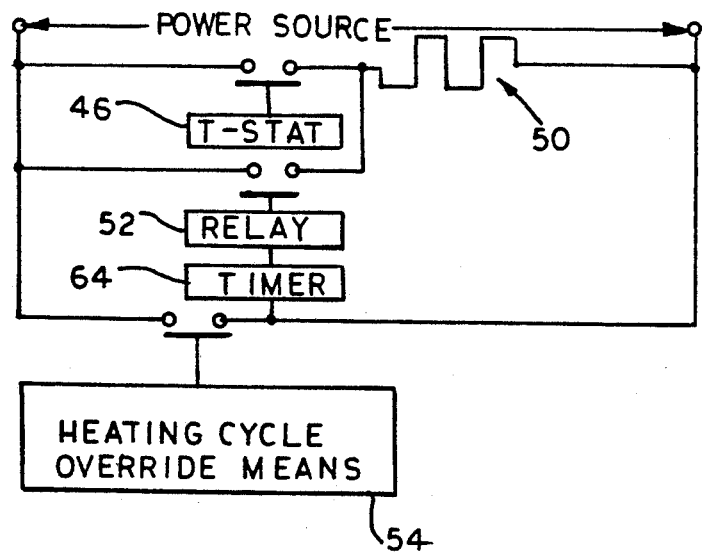
FIG. 2 is a schematic diagram of a temperature control device employed to override the thermostatically controlled heating means.

As shown in the schematic illustrated in FIG. 2, when the heating cycle override means 54 is activated, the circuit activates the inlet solenoid valve 60 which in turn results in activation of the temperature control device 52. Activation of the temperature control device 52 results in activation, superseding or overriding the thermostat 46 to result in activation of the heating element 50. As indicated, the thermostat 46 is overridden for a prespecified period of time or until the occurrence of an event as indicated by the timer 64 whereupon the heating element 50 is deactivated or retained in an active state depending upon the temperature of the water 24 in the heated reservoir 22.

The method of brewing coffee employed by the present invention provides substantial advantages in that the heating element 50 is activate upon initiating a brewing cycle to reduce the amount of time required to recover a desired brewing water 24 temperature upon the introduction of unheated fill water 26 during a brew cycle. This method includes maintaining a predetermined volume of preheated brewing water 24 in the reservoir 22 at a generally consistent temperature by the thermostatically controllable heating means 42. The method next requires control of the heating element 50 without regard for the temperature of the brewing water 24 retained in the heated reservoir 22. This overriding control is activated by initiating a brewing cycle. Next this method of brewing includes cessation of control of the thermostatically controllable heating means 42 upon the completion of a prespecified period of time or the occurrence of another event such as depletion of the fill water 26 from the basin 28 as indicated by the level sensor 58.

While preferred embodiments of the present invention are shown and described, it is envisioned that those skilled in the art may devise modifications of the present invention without departing from the spirit and scope of the appended claims.

The Invention is claimed as follows:

1. A method for controlling water temperature of a fill water displacement beverage brewing apparatus, said beverage brewing apparatus having a brew cycle during which a selected volume of heated water is dispensed from the beverage brewing apparatus to infuse a beverage brewing substance, said method including the following steps: providing a heated water reservoir, thermostatic controls operatively associated with said heated water reservoir for maintaining a generally consistent temperature of water retained in said heated water reservoir, and a heating device operatively associated with said thermostatic controls and said heated water reservoir for controllably heating the water retained in the heated water reservoir; maintaining a predetermined volume of water in the heated water reservoir within a predetermined temperature range; thermostatically controlling the temperature of said volume of water; activating a brew cycle; introducing fill water to the heated water reservoir to displace a portion of the heated water in said heated water reservoir and refill the heated water reservoir in proportion to the portion displaced thereby, the displaced portion of heated water providing water for the brew cycle; overriding said thermostatic controls and activating said heating device simultaneously with the initiation of the brew cycle to heat the water retained in the heated water reservoir and fill water introduced into the heated water reservoir; and continuing to override the thermostatic controls and activation of said heating device until a predetermined period of time is lapsed after the termination of the delivery of water to said heated water reservoir.

2. A method according to claim 1, further including the step of overriding said thermostatic controls and activating said heating device and heating said reservoir water for a prespecified period of time upon initiation of a brew cycle and returning control of the reservoir water temperature to the thermostatic controls and deactivating said heating device upon lapsing of a prespecified period of time after the termination of the delivery of water to said heated water reservoir.

3. A method for controlling water temperature of a fill water displacement beverage brewing apparatus, said beverage brewing apparatus having a brew cycle during which a selected volume of heated water is dispensed from the beverage brewing apparatus to infuse a beverage brewing substance, said method including the following steps:

provinding a heated water reservoir, thermostatic controls operatively associated with said heated water reservoir for maintaining a generally consistent temperature of water retained in said heated water reservoir, and a heating device operatively associated with said thermostatic controls and said heated water reservoir for controllably heating the water retained in the heated water reservoir;

maintaining a predetermined volume of water in the heated water reservoir within a predetermined temperature range;

thermostatically controlling the temperature of said volume of water;

initiating a brew cycle;

sensing the level of water in a basin in communication with said heated water reservoir;

introducing fill water to the heated water reservoir to displace a portion of the heated water in said heated water reservoir and refill the heated water reservoir in proportion to the portion displaced thereby, the displaced portion of heated water providing water for the brew cycle;

overriding said thermostatic controls and activating said heating device when a first prespecified volume of water is sensed in said basin to heat the water retained in the heated water reservoir and fill water introduced into the heated water reservoir; and continuing to override said thermostatic controls and activation of said heating device until a prespecified period of time after a second predetermined volume of water is sensed in said basin.

* * * * *